Dec. 15, 1959 C. M. TERRY 2,917,074
FLOW CONTROL VALVE
Filed Sept. 29, 1955
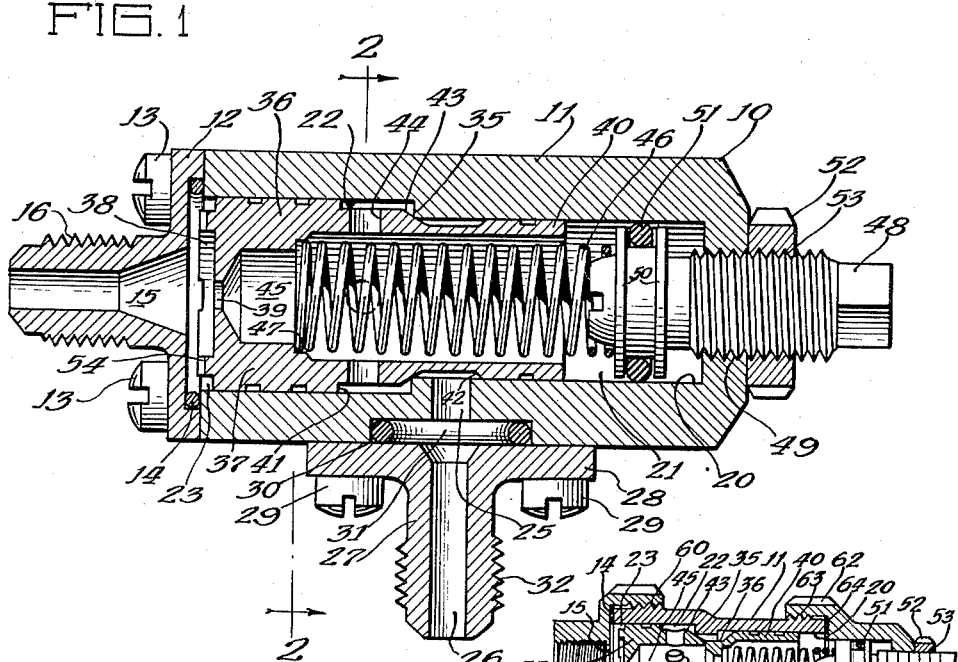
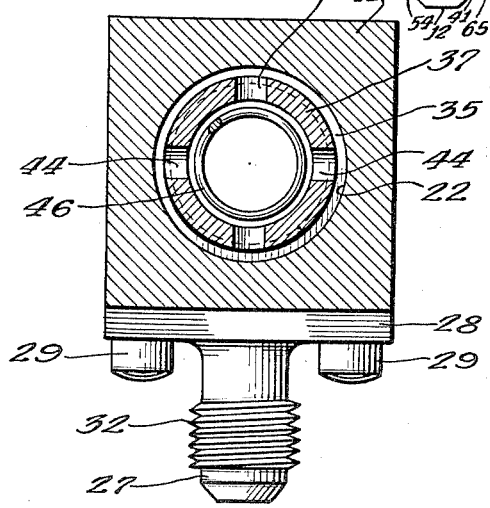
Inventor:
Charles M. Terry
By: Schroeder, Hofgren,
Brady & Wegner
Attorneys United States Patent Office 2,917,074
Patented Dec. 15, 1959

2,917,074
FLOW CONTROL VALVE

Charles M. Terry, Decatur, Ill., assignor to A. W. Cash Valve Manufacturing Corporation, a corporation of Illinois Application September 29, 1955, Serial No. 537,379

6 Claims. (Cl. 137—504)

This invention relates to a flow control valve, and, more particularly, to an improved flow control valve adapted for use in connection with fluid dispensing systems.

The primary object of this invention is to provide an improved flow control valve.

A further object of this invention is to provide a simple and reliable flow control valve in which a more nearly perfect pressure balance is maintained so as to permit only the slightest variation in the predetermined rate of flow.

Still another object of the invention is to provide an improved flow control valve having a multiple diameter hollow valve member slidably mounted in a chamber formed of two different diameters for maintaining a predetermined rate of liquid flow with only the slightest variation wherein the member has an orifice and a more nearly perfect pressure balance is maintained between the pressures acting on the member at opposite sides of the orifice.

The invention is illustrated in two different embodiments in the accompanying drawing, in which:

Fig. 1 is a longitudinal sectional view of one embodiment of a flow control valve embodying the invention;

Fig. 2 is a vertical section taken along the line 2—2 of Fig. 1; and

Fig. 3 is a longitudinal sectional view of a preferred embodiment of a flow control valve embodying the invention.

In the embodiment illustrated in Figs. 1 and 2, a flow control valve 10 has a casing 11 to which an end cover 12 may be secured by members such as threaded bolts 13. An O-ring 14 may be positioned between the casing 11 and end cover 12 to form a liquid seal.

The end cover 12 has a fluid inlet port 15 which may be connected to a conduit (not shown) from a suitable source of fluid under pressure by means of the threads 16 provided on the end cover 12.

The casing 11 has a cylindrical wall portion 20 forming a chamber section 21 of one diameter, and a wall portion 22 forming a chamber section 23 of a larger diameter.

A fluid outlet port 25 communicates with the chamber section 21 of smaller diameter and opens to a discharge passage 26 formed in an outlet member 27 having a flange 28 which may be attached to the casing 11 by members such as threaded bolts 29. The casing may be recessed at 30 to form a seat for an O-ring 31 which forms a seal between the flange 28 and the casing 11. A fluid conduit (not shown) may be attached to the outlet member 27 by means of the threads 32 provided on said member.

The cylindrical wall portions 20 and 22 form at their juncture a sharp-edged annular step 35 which constitutes a valve seat.

A multiple diameter hollow valve member 36 is slidably mounted in the chamber and has a piston member 37 provided with a perforate end wall 38 having an orifice 39 slidably mounted in the chamber section 23 of larger diameter. The opposite end of the hollow valve member is in the form of an annular skirt 40 which is slidably fitted in the chamber section 21 of smaller diameter.

A pair of annular recesses of different diameters on the outer periphery of the hollow valve member 36 are defined by the annular shoulders 41 and 42, respectively, and are connected by an annular inclined surface 43 forming a valve shoulder to close on and make line contact with the valve seat 35. A plurality of radial passages 44 connect the interior 45 of the hollow valve member 36 with the annular recess defined by the annular shoulder 41. The previously described outlet port 25 communicates with the annular recess of smaller diameter defined by the annular shoulder 42.

The interior 45 of the hollow valve member 36 receives a spring 46 which has one end in engagement with a shoulder 47 formed on the interior of the valve member and has its other end in engagement with a pressure-adjusting screw 48 which is adjustably mounted in an end of the casing 11 by a threaded connection indicated at 49. A pair of flanges 50 may be provided on the inner end of the adjusting screw to confine an O-ring 51 therebetween to effect a fluid seal. A lock nut 52 may be threadably connected to the adjusting screw 48, as indicated at 53, to hold the screw in adjusted position.

The end wall 38 of the valve member 36 is provided with a notched ring 54 to prevent contact between the end wall 38 and the end cover 12.

A preferred embodiment of a flow control valve embodying the invention is disclosed in Fig. 3. The flow control valves illustrated in Figs. 1 and 3 both utilize the same novel principles wherein the hollow valve member 36 has a piston member 37 slidably mounted in the chamber section 23 of larger diameter. The piston member 37 has a perforate end wall 38 formed with an orifice 39. The opposite end of the hollow valve member is in the form of an annular skirt 40 which is slidably fitted in the chamber section 21 of smaller diameter. The piston member and annular skirt of the hollow valve member 36 illustrated in Fig. 3 perform the same novel functions as those shown in Fig. 1; however, they have been formed separately in order to simplify the production of the hollow valve member.

Parts of the valve illustrated in Fig. 3 similar to those in the valve illustrated in Fig. 1 have been given similar reference numerals and the differences are described hereinafter.

The end cover 12 may be secured to the casing 11 by threaded connections 60. The fluid outlet port 25 communicates with the chamber section 21 of smaller diameter and constitutes the initial portion of a discharge passage 26 in an outlet member 27 formed on the casing 11.

The spring 46 disposed within the interior 45 of the hollow valve member has one end in engagement with a shoulder 61 formed on the interior of the skirt portion 40 of the hollow valve member and has its other end in engagement with the pressure-adjusting screw 48. An end cover 62 may be threadably connected to the casing 11, as indicated at 63, to secure the end cover to the casing and a gasket 64 provides a seal between the casing and the end cover.

The piston member 37 and the skirt 40 constituting the hollow valve member 36 function as a unitary member because the spring 46 causes the skirt 40 to engage with the piston member 37 along the annular engaging surfaces formed on the two parts and indicated at 65.

*Operation*

The flow control valve may be used in a beverage dispenser whereby fluid under pressure will enter the valve, and the outlet side of the valve connects with an on-off dispensing valve. When the dispensing valve is opened, the flow control valve becomes operative to insure a certain amount of fluid flowing for a unit of time.

The spring 46 is set by adjusting screw 48 to determine the desired pressure differential to be maintained between the pressures existing on opposite sides of the orifice 39; namely, that existing in the fluid inlet port 15 and that existing in the interior 45 of the valve member, respectively. When the valve is operating with the fluid entering the inlet port at a constant pressure, the valve shoulder 43 of the hollow valve member will be positioned away from the sharp-edged valve seat 35 to permit a constant rate of flow of fluid through the orifice 39 to pass out the outlet port 25. If the pressure of fluid in the inlet port 15 should increase, this acts upon the end wall 38 of the hollow valve member to shift the valve shoulder 43 toward the valve seat 35 so as to restrict or stop flow to the fluid outlet 25 until pressure builds up sufficiently within the hollow valve member to restore the predetermined differential pressure.

In the disclosed construction, the pressure existing within the interior 45 of the valve member 36 is always operative upon a predetermined area which is equal to that operated upon by the pressure of fluid in the inlet port 15. This aids in creating a more nearly perfect pressure balance.

The foregoing detailed description is given for clearness of understanding only, and no unnecessary limitations should be understood therefrom, for some modifications will be obvious to those skilled in the art.

I claim:

1. A flow control valve comprising: a casing having a chamber formed by chamber sections of two different diameters with an annular sharp-edged step constituting a valve seat intermediate the chamber sections; fluid inlet and outlet ports communicating with said chamber; a multiple diameter hollow valve member slidably mounted in both chamber sections and having an end wall adjacent the inlet port with a restricted passage relative to the inlet port; annular recesses of different diameters in the outer periphery of the hollow member connected by an annular inclined surface forming a valve shoulder to close on and make line contact with said valve seat; passages connecting the inside of the hollow member with the annular recess of greater diameter, said outlet port communicating with the other recess, said other recess having opposed end surfaces of substantially comparable effective radial extent to preclude biasing of the valve member by a fluid pressure at the outlet port; and a spring for urging said valve member to open position.

2. A device as specified in claim 1, in which the valve member has an annular skirt portion opposite the end wall slidable in the chamber section of smaller diameter and positioned between the fluid outlet port and adjacent chamber end so as to block fluid flow between said chamber end and said outlet port.

3. A device as specified in claim 1, in which the casing is provided with a threaded opening at one end; the spring extends within the hollow member, and an adjusting screw extends within the opening and in engagement with the spring to vary the spring compression.

4. A flow control valve comprising; a casing having a longitudinal chamber formed of two different diameters to provide an annular step forming a valve seat intermediate the chamber ends; a fluid inlet port in the housing adapted to direct fluid under pressure into the larger end of said chamber; a fluid outlet port communicating with the smaller end of said chamber; a hollow valve member having an end wall opposite the inlet port slidably fitted in the larger end of the chamber and an annular skirt portion slidably fitted in the smaller end of the chamber, said end wall having a flow restricting passage; an annular inclined valve shoulder formed on the outer periphery of said hollow member to close against the valve seat; annular recesses in said valve member on both sides of said valve shoulder; radial passages connecting the inside of the hollow member with one of said recesses, the fluid outlet port communicating with the other recess, said other recess having opposed end surfaces of substantially comparable effective radial extent to preclude biasing of the valve member by a fluid pressure at the outlet port; and a spring for urging the valve member to open position.

5. A device as specified in claim 4, in which said annular skirt portion is formed with a shoulder and the spring abuts said shoulder.

6. A device as specified in claim 4, in which the annular step forming the valve seat is sharp-edged so as to make line contact with the valve member so that the area of the hollow member exposed to fluid pressure does not vary substantially when said valve member engages said valve seat.

References Cited in the file of this patent

UNITED STATES PATENTS

| 1,579,251 | Schossow | Apr. 6, 1926 |
| 2,294,702 | Van Der Werff | Sept. 1, 1942 |
| 2,312,877 | Campbell | Mar. 2, 1943 |
| 2,411,392 | Saville | Nov. 19, 1946 |

FOREIGN PATENTS

| 13,595 | Great Britain | May 26, 1904 |
| 682,049 | Germany | Oct. 6, 1939 |